(12) United States Patent
Sharma

(10) Patent No.: US 6,914,728 B2
(45) Date of Patent: Jul. 5, 2005

(54) OPTICAL ARRANGEMENT FOR MICROSCOPE OBJECTIVE

(75) Inventor: Keshav D. Sharma, Lancaster, NY (US)

(73) Assignee: Leica Microsystems Inc., Buffalo, NY (US)

( * ) Notice: Subject to any disclaimer, the term of this patent is extended or adjusted under 35 U.S.C. 154(b) by 0 days.

(21) Appl. No.: 10/313,721

(22) Filed: Dec. 5, 2002

(65) Prior Publication Data

US 2004/0109238 A1 Jun. 10, 2004

(51) Int. Cl.$^7$ .............................. G02B 3/00; G02B 9/00
(52) U.S. Cl. ...................................... 359/660; 359/656
(58) Field of Search ................................ 359/656–659, 359/763–764, 771–772, 754–756, 660

(56) References Cited

U.S. PATENT DOCUMENTS

| | | | |
|---|---|---|---|
| 3,137,761 A | * 6/1964 | Conradi et al. | 359/388 |
| 3,380,793 A | 4/1968 | Klein | 359/657 |
| 3,530,436 A | 9/1970 | Bertele et al. | 359/657 |
| 4,009,945 A | 3/1977 | Klein | 359/657 |
| 4,563,060 A | * 1/1986 | Yamagishi | 359/658 |
| 5,517,360 A | * 5/1996 | Suzuki | 359/658 |
| 6,560,032 B2 | * 5/2003 | Hatano | 359/656 |

OTHER PUBLICATIONS

K.D. Sharma. "Medium Power Microobjective: A New Design", Applied Optics, vol. 24, p. 299, Jan., 1985.

* cited by examiner

*Primary Examiner*—Jordan M. Schwartz
(74) *Attorney, Agent, or Firm*—Simpson & Simpson, PLLC

(57) ABSTRACT

This invention relates to a microscope having an infinity-corrected objective and providing a flat field of view. The present invention is an optical arrangement that broadly comprises a first lens element having positive power and comprising at least one lens, a second lens element having negative power and comprising at least one lens, a third lens element having positive power and comprising at least one lens, a fourth lens element having positive power and comprising at least one lens, and a fifth lens element comprising at least one lens and having positive power, and, in addition comprising a configuration in which the radius of curvature of the surface of the fifth lens element proximate to the object plane is less than the radius of curvature of the surface of the fifth lens element distal to the object plane, with the optical arrangement arrayed such that the distance from the first lens element to the second lens element is sufficient to reduce a ray height of a light ray entering the second lens element from the ray height of the same light ray entering said first lens element.

12 Claims, 3 Drawing Sheets

OPTICAL ARRANGEMENT FOR MICROSCOPE OBJECTIVE

FIELD OF THE INVENTION

The present invention relates generally to compound microscopes and to those instruments which use the same or similar optical arrangements found in a conventional compound microscope.

BACKGROUND

As is well known, a microscope is an optical instrument used to view, examine and study very fine details of an object. The most critical component of the microscope is the microscope objective. The magnifying power and the resolution of the fine details of objects being examined are mainly dependent on the objective characteristics.

One of the common defects of the microscope objective is the lack of correction of field curvature. This arises from the fact that the majority of lens elements in a microscope objective have positive power, which in turn have inward curving fields. The inward curving field is to some extent offset by the use of negative lenses, which contribute outward curving field curvature and are required for correction of other aberrations, such as spherical aberration, astigmatism, distortion, coma, and chromatic aberration. However, since the overall power of the objective is positive, in normal achromat designs, the field of view retains an inward curvature. This inward curvature permits a clear image of an object under study only in the center of the field of view while objects at the periphery of the field are blurred. This problem was addressed to some extent by K. D. Sharma in *Applied Optics*, vol. 24 p.299 in an article entitled "Medium Power Microobjective: A New Design" which article is hereby incorporated by reference. The article discusses an arrangement of lenses where a negative lens helps to flatten the curvature of the field of view.

What is needed then is an optical arrangement of lenses that meets the requirements of magnification and numerical aperture (NA) which has a flat field and diffraction limited performance.

SUMMARY OF THE INVENTION

The present invention relates to the design of a medium power microscope objective generally used on a compound microscope. The invention discloses a new arrangement of lenses, which provide correction to the field curvature along with other aberrations. This simple arrangement is capable of providing diffraction limited performance over the entire field of view.

The new optical arrangement broadly comprises a first lens element having positive power and comprising at least one lens, a second lens element having negative power and comprising at least one lens, a third lens element having positive power and comprising at least one lens, a fourth lens element having positive power and comprising at least one lens, and a fifth lens element comprising at least one lens and having positive power, and, in addition comprising a configuration in which the radius of curvature of the surface of the fifth lens element proximate to an object plane is less than the radius of curvature of the surface of the fifth lens element distal to the object plane, with the optical arrangement arrayed such that the distance from the first lens element to the second lens element is sufficient to enable an increase in a ray height of a light ray entering the first lens element from the ray height of the same light ray exiting the second lens element.

An object of the invention is to reduce the inward field curvature of the viewing area of a magnifying optical arrangement.

An additional object of the invention is to present an optical arrangement with a high level of aberration correction.

A further objective is to provide an optical arrangement in which Strehal ratios are greater than 0.8 over the entire field of view.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which.

DETAILED DESCRIPTION OF THE INVENTION

At the outset, it should be appreciated that like drawing numbers on different drawing views identify identical structural elements of the invention.

While the present invention is described with respect to what is presently considered to be the preferred embodiments, it is understood that the invention is not limited to the disclosed embodiments. The present invention is intended to cover various modifications and equivalent arrangements included within the scope of the appended claims.

In the detailed description of the invention, the following definitions apply:

Strehal Ratio is the ratio of the peak intensity in the diffraction pattern of an aberrated point image to the peak intensity in the diffraction pattern of the point image without aberrations. A high Strehal ratio indicates a high level of aberration correction.

Petzval Curvature is a basic field curvature associated with an optical system.

Diffraction limited describes an optical system in which the resolution of the image is determined only by the effects of diffraction and not by lens aberrations. Generally, an acceptable diffraction limited system has a Strehal ratio of 0.80 or greater. An ideal optical system will have no aberrations and a Strehal ratio of 1.0.

Positive power is a characteristic of some lenses in which light rays exiting the lens are refracted toward the optical axis of the lens.

Negative power is a characteristic of some lenses in which light rays exiting the lens are refracted away from the optical axis of the lens.

Ray height is the vertical distance from the optical axis to the point on a lens surface where a particular light ray enters or exits a lens.

Vignetting is the gradual reduction of image illuminance with an increasing off-axis angle, resulting from limitations of the clear apertures of elements within an optical system.

Figure 1:
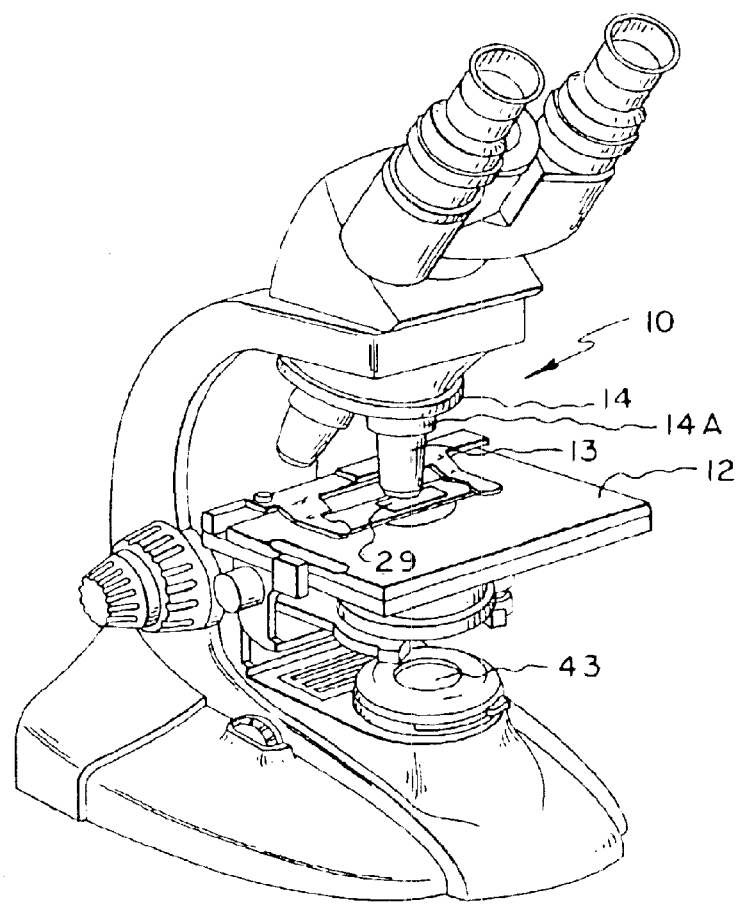
FIG. 1 is a perspective view of a typical compound microscope with which the optical arrangement of the present invention is adaptable for use.

Adverting to the drawings, FIG. 1 depicts a compound microscope 10 having a light source 43 illuminating an aperture (not shown) in stage 12. Cover slip 29 covers an object being studied (not shown). Objective 13 is attached to nosepiece 14 at attachment point 14A. Objective 13 is positioned so as to transmit light from light source 43 through the aperture and cover slip 29 to the nosepiece 14 after the light illuminates the object being studied. Although light source 43 shown in FIG. 1 illuminates the object directly, it should be understood that the object may be illuminated by indirect illumination such as by the use of mirrors to reflect light from a light source through the object being studied to objective 13.

Figure 2A:
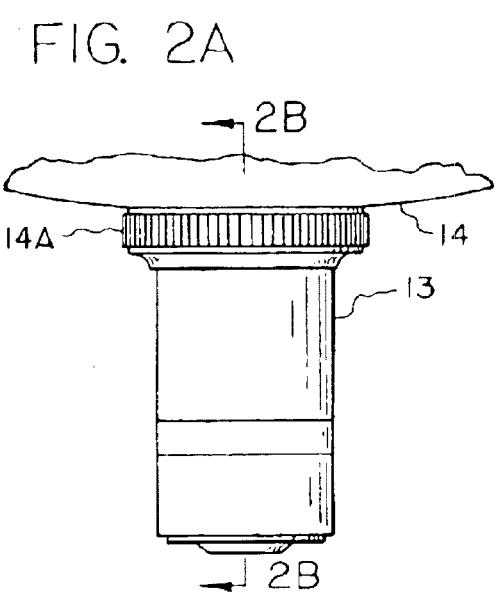
FIG. 2A is a front view of an objective of the compound microscope of FIG. 1.
Figure 2B:
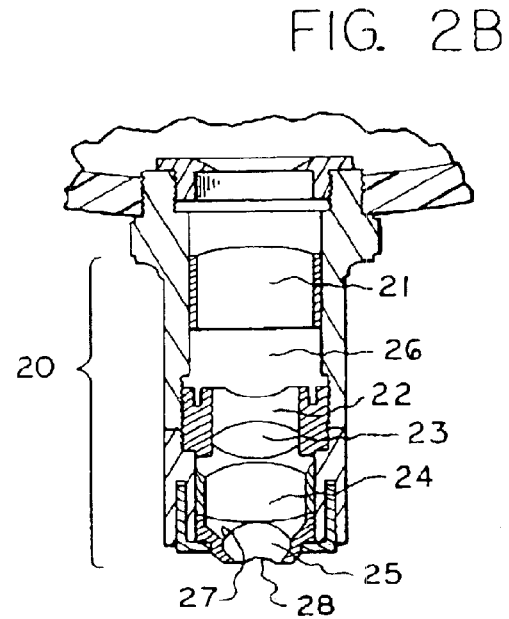
FIG. 2B is a cross-section of the microscope objective depicted in FIG. 2A.

FIG. 2A is a front view of objective 13 of a compound microscope 10. FIG. 2B depicts a cross-section of objective 13 taken along line 2B—2B of FIG. 2A containing optical arrangement 20 of the instant invention. First lens element 21 is located proximate to nosepiece 14. First lens element 21 has positive power. In a preferred embodiment, first lens element 21 has a high index of refraction. In a more preferred embodiment, first lens element 21 has an index of refraction above about 1.7. In a still more preferred embodiment, first lens element 21 has a thickness of between about 5 and 7 mm and has a plano-convex configuration. The high index of refraction helps to reduce spherical aberration and to decrease the Petzval curvature of optical arrangement 20. The thickness of first lens element 21 contributes to an increase in ray height of the light rays entering and exiting first lens element 21. Persons skilled in the art will recognize that more than one lens may comprise first lens element 21 provided that the individual lenses combine to have a positive power and, preferably, a high index of refraction.

Second lens element 22 is depicted in FIG. 2B. Gap 26 is a relatively large space between first lens element 21 and second lens element 22. Second lens element 22 has negative power which contributes to the reduction of the Petzval curvature of optical arrangement 20. As is well known in the art, a reduction in the Petzval Curvature of an optical system or arrangement reduces the field curvature of an optical system and thus acts to flatten the viewing fields of an optical system. Gap 26 is large in relation to the separations between the other lens elements of optical arrangement 20. (See Table I below comparing separation between the surfaces of the lens elements.) In a preferred embodiment, gap 26 is about 5 mm. As gap 26 increases, the light rays exiting from second lens element 22 travel a relatively longer distance than between prior lens elements in optical arrangement 20 before entering first lens element 21. The divergent nature of light ray 31 with respect to light ray 32 in combination with the length of gap 26 causes the ray heights of the light rays entering first lens element 21 to be greater than the ray heights of the same light rays exiting second lens element 22. Using the formula $\Phi=hk$ where $\Phi$ is effective lens power, h is ray height and k is actual lens power, it can be seen that as the ray height is increased, the effective lens power will be increased. In the case of second lens element 22, a reduced ray height will decrease the effective lens power of negative second lens element 22 thereby reducing the negative contribution of second lens element 22 to the overall effective power of optical arrangement 20. Because Petzval Curvature is independent of ray height, the negative contribution of second lens element 22 to the Petzval Curvature of optical arrangement 20 is not diminished by an increase in ray height or effective negative power of second lens element 22. However, it is well known in the art that as the ray height of a light ray approaches zero, it becomes increasingly difficult to correct for optical aberrations. Preferably, the ray height of light rays entering first lens element 22 is not increased above 200% of the ray height of the same light rays as they exit second lens element 22 in optical arrangement 20 of the present invention. Persons skilled in the art will recognize that more than one lens may comprise second lens element 22 provided that all lenses comprising second lens element 22 together make a negative contribution to the Petzval Curvature of optical arrangement 20 of the instant invention.

Third lens element 23 is depicted in FIG. 2B. Third lens element 23 has positive power and therefore acts to decrease the angle of divergence of the light entering second lens element 22 and exiting third lens element 23. In a preferred embodiment, second lens element 22 and third lens element 23 have widely differing V-numbers (Abbe Abbé numbers) which aids in correcting the color aberration of optical arrangement 20. In a more preferred embodiment, the V-numbers of second lens element 22 and third element 23 will differ by a value of about 30 or greater. In an even more preferred embodiment, the V-numbers of second lens element 22 and third element 23 will differ by a value of about 50 or greater. In a most preferred embodiment, second lens element 22 and third lens element 23 will be fixedly attached using Norland Optical Adhesive Grade 61 or equivalent to form a negative doublet as seen in FIG. 2B.

Fourth lens element 24 is shown in FIG. 2B. Fourth lens element 24 has positive power. The fourth lens element 24 has a relatively high index of refraction and sufficient power to direct the exiting light rays using a desired numerical aperture. In a preferred embodiment, the fourth lens element 24 has low dispersion which reduces chromatic aberrations. In a preferred embodiment, the index of refraction is about 1.55 when utilized in an optical system with a numerical aperture of 0.65. In a more preferred embodiment, the index of refraction is about 1.6 when utilized in an optical system with a numerical aperture of 0.65.

Fifth lens element 25 is shown in FIG. 2B. Because of its thickness, fifth lens element 25 has positive power. The radius of curvature of surface 27, which is distal from object plane 11, is larger than the radius of curvature of surface 28, which is proximal to object plane 11. This configuration of surfaces 27 and 28 creates a negative contribution to the Petzval curvature of the optical arrangement 20, which helps in field flattening.

Figure 3:
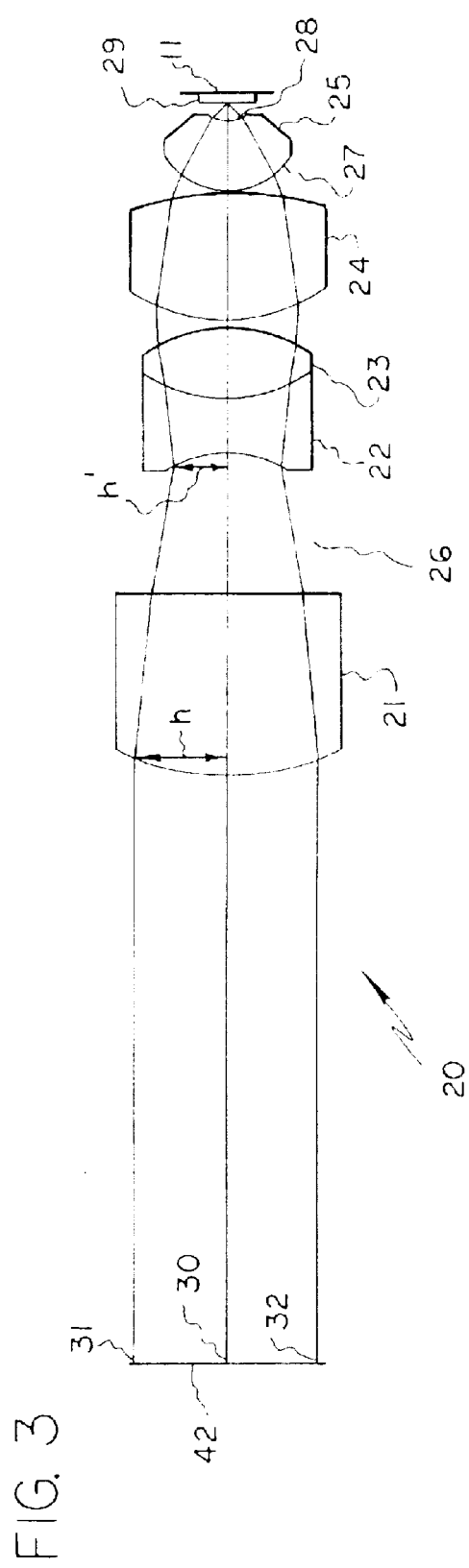
FIG. 3 is a schematic view of a preferred embodiment of the optical arrangement of the present invention demonstrating the path of light rays transmitted through the optical arrangement.

FIG. 3 is a schematic representation of a preferred embodiment of optical arrangement 20 demonstrating the path of light rays 31 and 32 passing through optical arrangement 20 of the present invention. Optical axis 30 is also depicted. Ray height for light ray 31 exiting first lens element 21 is shown as h, while ray height of light ray 31 as it exits second lens element 22 is shown as h'. As defined above, ray height is the vertical distance from the optical axis to the point on a lens surface where a particular light ray enters or exits a lens. In optical arrangement 20 of the current invention, ray height h is greater than ray height h'. As can be seen in FIG. 3, as light rays 31 and 32 enter first lens element 21, which has positive power, they converge toward optical axis 30 as they pass through first lens element 21. Light rays 31 and 32 diverge from optical axis 30 after they exit from second lens element 22 and pass through gap 26 to first lens element 21. Consequently, as gap 26 increases, ray height (not shown) at the entrance point on first lens element 21 will increase.

Second lens element 22, having negative power, causes the light rays to diverge away from optical axis 30 while giving rise to a negative contribution to the total Petzval Curvature of optical arrangement 20. As light rays 31 and 32 pass into and out of third lens element 23, which has positive power, they converge toward optical axis 30 to a greater degree than in second lens element 22. In a preferred embodiment, second lens element 22 and third lens element 23 are joined together to form a negative doublet. Such a doublet can be formed using optical cement such as Norland Optical Cement 61. The glasses used for second lens element 22 and third lens element 23 preferably have widely differing V-numbers (Abbé values) which allows for color correction and also helps to avoid steep curvatures in the doublet. As rays 31 and 32 enter into, pass through, and exit from fifth lens element 25 and fourth lens element 24, they converge toward optical axis 30. Fifth lens element 25 is configured to possess sufficient thickness to have positive power and a larger radius of curvature for surface 27 than the radius of curvature of surface 28. As described above, such an increase in radius of curvature between surface 27 and surface 28 produces a negative contribution to the Petzval curvature of optical arrangement 20 thereby contributing to a flat field of view. Glass 29 has two flat surfaces perpendicular to optical axis 30 and is positioned proximate to object plane 11 in relation to the lens elements described above. In a preferred embodiment, glass 29 is a cover slip placed over a suitable object being investigated (not shown). A preferred embodiment of optical arrangement 20 of the current invention is given in the example below.

EXAMPLE

Figure 4:
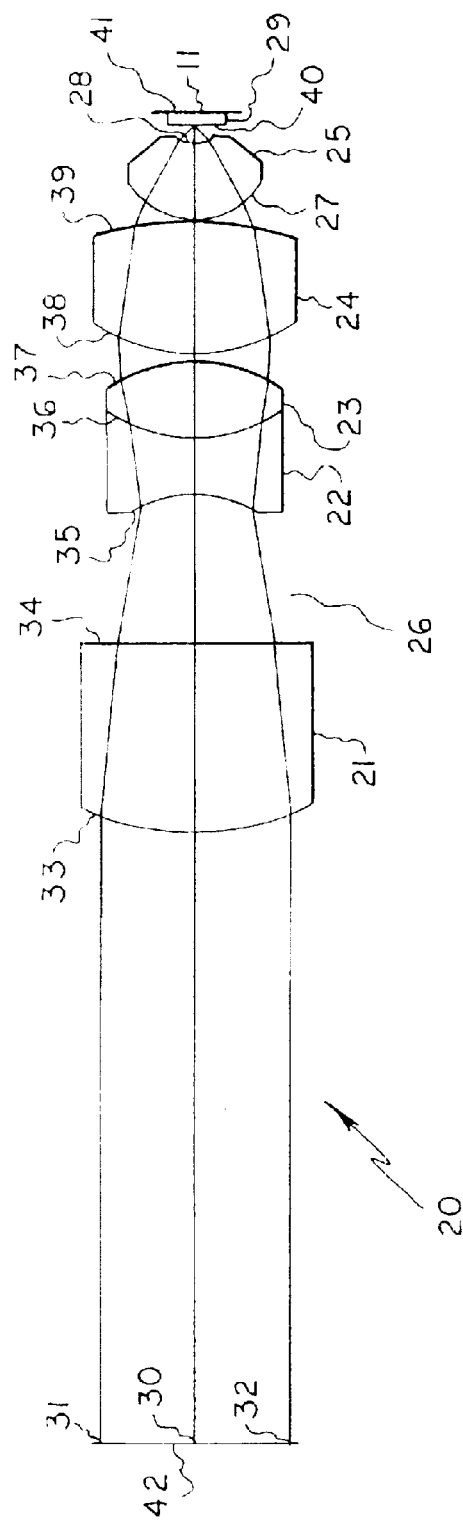
FIG. 4 is a schematic view of a preferred embodiment of the optical arrangement of the present invention similar to FIG. 3 depicting the surfaces of the lens elements of the present invention; and, FIG. 5 is a graphic presentation of Optical Path Difference curves for monochromatic light at different points in the field of view.

A preferred embodiment of the above described optical arrangement 20 is seen in the assembly of lens elements listed below in Table I and depicted in FIG. 4. Surface Number refers to the surface of each lens through which optical axis 30 passes. For example, first lens element 21 comprises surface 33 and surface 34. Radius of curvature is one-half the diameter of a sphere defining the convex or concave surface of a lens. A surface having a radius of curvature of infinity indicates the surface is flat or planar. Separation refers to the distance between the lens surfaces as measured along optical axis 30. For example, as seen in Table I, the separation between surface 33 and surface 34 is 6.01 mm indicating lens element 21 is 6.01 mm thick along optical axis 30. The distance between surface 34 and surface 35 is 5.042 mm indicating a gap 26 of 5.042 mm between surface 34 of lens element 21 and surface 35 of lens element 22 as measured along optical axis 30. Clear diameter is the clear aperture of an optical component measured in millimeters that controls the amount of light incident on a given surface. The optical glasses listed under Schott Glass are types of optical glass manufactured by Schott Glass Technologies. As depicted in FIG. 4, Surface 42 is the attachment point 14A of the objective to microscope 10 as seen in FIGS. 1 and 2A.

TABLE I

| Lens Element | Surface No. | Radius of Curvature | Separation (in mm.) | Clear Diameter | Schott Glass |
|---|---|---|---|---|---|
| | 42 | infinity | 21.2780 | 7.80 | |
| 21 | 33 | 15.35625 | 6.0100 | 6.62 | LASF36A |
| | 34 | infinity | 5.0420 | 5.42 | |
| 22 | 35 | −4.58682 | 1.9500 | 3.83 | SF10 |
| 23 | 36 | 5.28102 | 2.6000 | 4.38 | FK51 |
| | 37 | −5.28102 | 0.2000 | 4.96 | |
| 24 | 38 | 6.10571 | 4.5200 | 5.07 | PSK53A |
| | 39 | −11.51677 | 0.0500 | 3.94 | |
| 25 | 27 | 2.59263 | 2.7400 | 3.33 | LAK8 |
| | 28 | 2.02745 | 0.5000 | 0.93 | |
| 29 | 40 | infinity | 0.1700 | 0.52 | K5 |
| | 41 | Infinity (Object plane) | 0.0000 | 0.50 | |

The design depicted schematically in FIG. 4 uses the lenses listed in Table I and is optimized for an infinite conjugate, a focal length of 5 mm, a numerical aperture of 0.65, and a field size of 0.5 mm in object plane 11. The vignetting is controlled by restricting the clear aperture of Surface 42 of Table I to 7.8 mm. For a numerical aperture (NA) of 0.65, a minimum clear aperture of only 6.5 mm is required at the field aperture. The working distance is fixed at 0.5 mm.

The performance of the design is evaluated by calculating the Strehl ratio. The Strehl ratio values are given in Table II for monochromatic light at a wavelength of 0.5461 microns (e-line) as well for polychromatic light at four different fields, namely full, 0.707, half, and on axis. To represent polychromatic light, five wavelengths have been used. These wavelengths in microns are 0.48, 0.51, 0.5461, 0.59, and 0.644. The respective color weights for these wavelengths are taken as 0.3, 0.6, 1.0, 0.6, and 0.3. As can be seen from Table II, the Strehl ratio values at different fields for monochromatic light are between 0.958 and 0.895. The Strehl ratio values for polychromatic light are between 0.91 and 0.884. A value of 0.80 represents a diffraction limited system. The results shown in Table II are well above the diffraction limit and indicate that the design described above has a very high level of aberration correction and results in an extremely flat field over the whole field of view.

TABLE II

| | | Strehl Ratio | |
|---|---|---|---|
| Field Number. | Half Field Size (in mm) | Monochromatic Strehl Ratio | Polychromatic Strehl Ratio |
| 1 | 0.000 | 0.958 | 0.910 |
| 2 | 0.125 | 0.956 | 0.887 |
| 3 | 0.176 | 0.935 | 0.893 |
| 4 | 0.250 | 0.895 | 0.884 |

Figure 5:
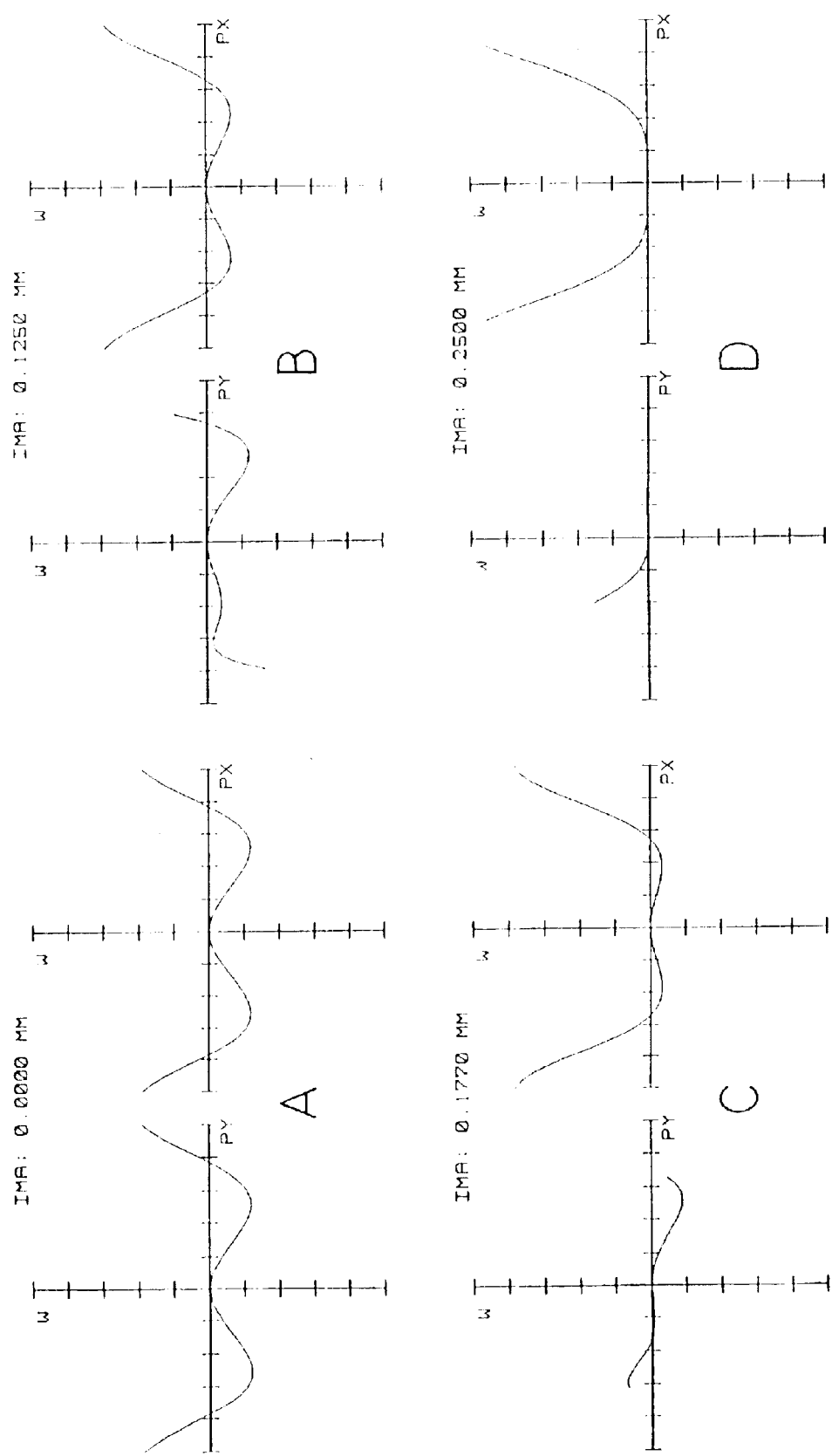

In addition, a plot of Optical Path Difference curves is shown for the e-line in FIG. 5. These curves indicate that the residuals of the wave front aberration are very small for the entire field. (Each scale mark in FIG. 5 is for 0.04 waves.) FIG. 5A shows that on axis (0.0 field size), the wave front aberration is only 0.08 waves. Wave front aberration in FIGS. 5B (0.125 half field), 5C (0.176 half field) and 5D (0.25 half field) is approximately 0.2 wave. These curves demonstrate the design is well corrected over the entire filed of view and corroborates the results shown from the Strehal Ratio analysis.

As described above, it is noted that the optical glasses listed in Table I are selected for correction of aberrations such as spherical aberration, coma, astigmatism, Petzval curvature, distortion, and chromatic aberrations. Persons skilled in the art will recognize that other optical glasses with similar properties may be used in optical arrangement 20 to obtain a flattened field while still achieving a high correction of optical aberrations.

Similarly, although the Example described above is designed for an optical arrangement having a numerical aperture of about 0.65 and focal length of 5 mm, persons skilled in the art will recognize that similar optical arrangements may be designed having different numerical apertures and focal lengths. Such systems may utilize a greater or lesser number of positive lenses following the second negative lens element 22 to direct light from a final lens element that both possesses positive power and makes a negative contribution to Petzval curvature similar to lens element 25.

Thus it is seen that the objects of the invention are efficiently obtained, although changes and modifications to the invention should be readily apparent to those having ordinary skill in the art, which changes would not depart from the scope of the invention as claimed.

I claim:

1. An optical arrangement for a microscope objective comprising in order and in the absence of one or more intervening lenses:
   a first lens having a positive power;
   a second lens having a negative power;
   a third lens having a positive power;
   a fourth lens having a positive power; and,
   a fifth lens having a positive power wherein the absolute value of a radius of curvature of the surface of said fifth lens proximate to an object plane is less than the absolute value of a radius of curvature of the surface of said fifth lens distal to said object plane;
   wherein the gap between said first lens and said second lens is sufficient to increase the ray height of a light ray entering said first lens from the ray height of said light ray exiting said second lens, and;
   wherein said optical arrangement is positioned on the opposite of said object plane than a source of said light ray.

2. The optical arrangement according to claim 1 wherein said increase in ray height is about 200%.

3. The optical arrangement according to claim 1, wherein said first lens has a refractive index of at least about 1.55.

4. The optical arrangement according to claim 1 wherein said first lens has a plano-convex shape, said plane surface facing said object plane.

5. The optical arrangement according to claim 1 wherein the V-number of said second lens differs from the V-number of said third lens by at least about 30.

6. The optical arrangement according to claim 5, wherein said second lens is fixedly attached to said third lens.

7. The optical arrangement according to claim 1, wherein said fourth lens has a refractive index of at least about 1.55.

8. The optical arrangement according to claim 1 further comprising an optical element wherein said optical element has a surface proximate to said object plane and a surface distal to said object plane wherein both of said proximal and distal surfaces are flat and wherein said optical element is positioned between said fifth lens and said object plane.

9. The optical arrangement according to claim 8 wherein said optical element is a cover slip.

10. The optical arrangement according to claim 1 wherein said gap is about 5 mm in length.

11. An optical arrangement for a microscope objective comprising in order and in the absence of one or more intervening lenses:
    a first lens having a positive power;
    a second lens having a negative power;
    a third lens having a positive power;
    a fourth lens having a positive power; and,
    a fifth lens having a positive power wherein the absolute value of a radius of curvature of the surface of said fifth lens proximate to an object plane is less than the absolute value of a radius of curvature of the surface of said fifth lens distal to said object plane;
    wherein the gap between said first lens and said second lens is sufficient to increase the ray height of a light ray entering said first lens from the ray height of said light ray exiting said second lens, and;
    wherein said second lens is fixedly attached to said third lens and the V-number of said second lens differs from the V-number of said third lens by at least about 30.

12. An optical arrangement for a microscope objective comprising in order and in the absence of one or more intervening lenses:
    a first lens having a positive power;
    a second lens having a negative power;
    a third lens having a positive power;
    a fourth lens having a positive power; and,
    a fifth lens having a positive power wherein the absolute value of a radius of curvature of the surface of said fifth lens proximate to an object plane is less than the absolute value of a radius of curvature of the surface of said fifth lens distal to said object plane;
    wherein the gap between said first lens and said second lens is sufficient to increase the ray height of a light ray entering said first lens from the ray height of said light ray exiting said second lens and wherein said gap is about 5 mm in length.

* * * * *